United States Patent [19]

Nilssen

[11] 3,711,656

[45] Jan. 16, 1973

[54] MULTI-CHANNEL MAGNETIC TAPE HEAD IN WHICH THE CORE IS SHIFTED FOR POSITIONING THE PICKUP PORTIONS

[75] Inventor: Ole K. Nilssen, Barrington Hills, Ill.

[73] Assignee: Motorola, Inc., Franklin Park, Ill.

[22] Filed: July 21, 1971

[21] Appl. No.: 164,750

[52] U.S. Cl..179/100.2 C, 340/174.1 C, 346/74 MC

[51] Int. Cl. ............................G11b 5/16, G11b 5/28

[58] Field of Search.179/100.2 C, 100.2 MD, 100.2 CA; 340/174.1 F; 346/74 MC

[56] References Cited

UNITED STATES PATENTS

| | | | |
|---|---|---|---|
| 3,004,111 | 10/1961 | Hollingsworth | 179/100.2 CA |
| 2,561,338 | 7/1951 | Camras | 179/100.2 MD |
| 3,382,326 | 5/1968 | Camras | 179/100.2 C |
| 2,785,038 | 3/1957 | Ferber | 346/74 MC |
| 2,769,036 | 10/1956 | Selsted | 179/100.2 C |
| 3,440,359 | 4/1969 | Page et al. | 179/100.2 CA |

*Primary Examiner*—Vincent P. Canney
*Assistant Examiner*—Alfred H. Eddleman
*Attorney*—Mueller & Aichele

[57] ABSTRACT

A laminated multi-channel magnetic tape head apparatus has alternate lamina of copper and iron, with the iron lamina having gaps for recording/reproducing separate tape channels of multi-channel tapes. A copper insert and suitable connectors form electrical conducting loops around a portion of each magnetic lamina, magnetic flux being induced in the magnetic lamina during recording and current being induced in the conducting loops during reproducing. An iron core piece with a coil mounted thereon magnetically transfers an electrical signal between a current conduction loop and the coil, with the coil being connected to a sound recording/reproducing system. Either the iron core piece is shifted from one magnetic lamina to another or switching between iron core pieces occurs thereby positioning the pickup portions of the tape head to the various tracks on the tape without physically moving the entire head assembly.

4 Claims, 4 Drawing Figures

PATENTED JAN 16 1973 3,711,656

INVENTOR.
OLE K. NILSSEN
BY Mueller & Aichele
ATTORNEYS.

MULTI-CHANNEL MAGNETIC TAPE HEAD IN WHICH THE CORE IS SHIFTED FOR POSITIONING THE PICKUP PORTIONS

BACKGROUND OF THE INVENTION

Where stereo tapes with four or more tracks have been used in the past, generally either two tape heads have been required or else a tape head with two pickups is physically moved between the tracks on the tape. One reason necessitating this is the fact that the cost of making a tape head having more than two pickup portions is prohibitive. Furthermore, separate heads having multiple pickups create certain problems because the gas are spaced in close proximity to one another in order to be alignable with the plurality of tracks contained on the usually narrow tapes. In most tape heads each pickup utilizes separate windings which are also closely spaced resulting in "cross talk" problems between tape channels.

SUMMARY OF THE INVENTION

It is an object of this invention to provide improved, economical tape head apparatus for recording or reproducing multi-track tapes.

It is another object of this invention to provide improved alignment accuracy between corresponding tape channels and tape head gaps.

In one embodiment the multiple channel tape head apparatus of this invention includes a plurality of copper lamina alternately assembled with iron lamina of approximately the same shape and joined together by a press fitted copper insert which together with the copper lamina and a copper plate connected to the lamina form current conducting loops around a portion of each iron lamina. The iron lamina have recording or reproducing gaps across which the tape transverses. The magnetic iron lamina have changing fluxes which induce current in the current conducting loops when reproducing signals. These changing magnetic fluxes are coupled to coils by iron core pieces on which the coils are mounted. The coils in turn are electrically coupled to terminals which feed the picked up signal to the reproducing apparatus. For recording, the operation is reversed and a signal is applied at the terminals which are coupled through the above described means to record on the tape. The iron core pieces which are used for coupling changes in the magnetic flux are joined in spaced relation by bracket means which together with cam shifting apparatus shift the coupling means from one set of iron lamina to another set, thus changing from one set of tape channels to another.

In another embodiment of the invention each iron lamina has an individual iron core piece, and a separate coil joined thereto. The coils are joined to switching apparatus which switch from one set of tape head channels to another set by manual or electronic means. The switch in turn is coupled to the recorder/reproducer. The iron lamina and iron core pieces in this particular embodiment may be formed of a single portion of iron rather than two separate pieces. Each copper lamina may have gaps in the same spaced relation as the gaps of the iron lamina.

DETAILED DESCRIPTION OF THE INVENTION

Figures 1, 2, 3, 4:
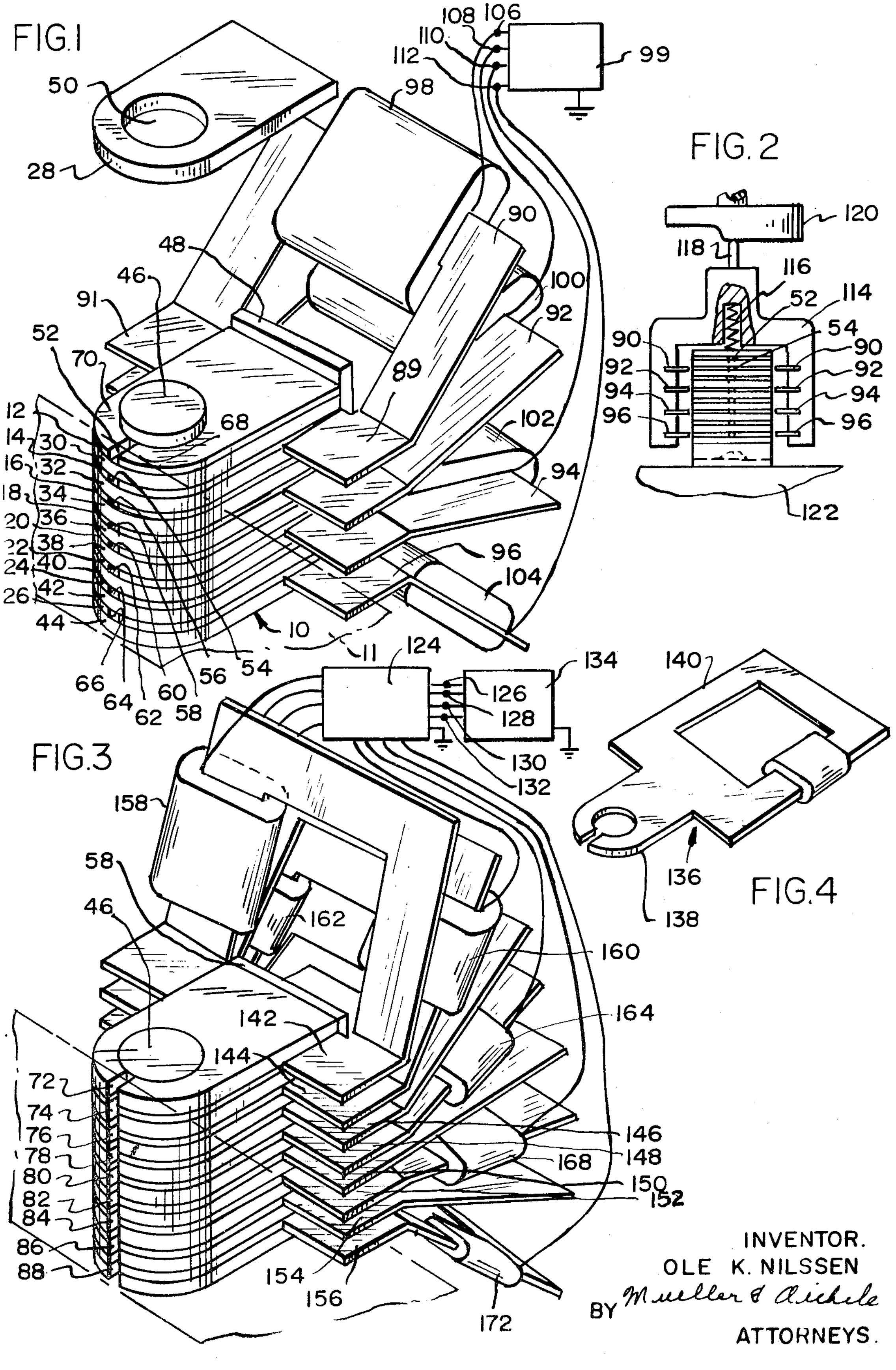
FIG. 1 is a partially exploded view of a magnetic tape head in perspective in accordance with this invention.
FIG. 2 is a front plan view of a magnetic head apparatus in accordance with this invention.
FIG. 3 is a perspective view of another embodiment of a magnetic tape head in accordance with this invention.
FIG. 4 is a perspective view of a portion of the magnetic tape head of FIG. 3.

Referring to FIG. 1, the multiple channel tape head 10 is suited for utilization with an 8 track, 4 channel tape recorder/reproducer, where the tape channels are close together on the tape media 11. Accurate shifting from one set of tape head gaps 52, 56, 60 and 64 to another set 54, 58, 62 and 66 can be accomplished without moving the entire tape head 10 structure with each set forming a separate four channel output.

The tape head construction provides a plurality of alternating lamina of nonmagnetic conducting material such as copper and magnetic material such as oxidized iron. Copper lamina 28, 30, 32, 34, 36, 38, 40, 42 and 44 when joined with nonmagnetic conducting insert 46 and nonmagnetic conducting plate 48 form a current conduction loop around a portion of each magnetic lamina. Both insert 46 and plate 48 may be made of copper. The insert 46 may be press fitted to the indexing hole 50 to join the copper and iron lamina together. Both top and bottom lamina 28 and 44, respectively, are copper and form parts of an electrical current conduction loop around a portion of the tape head 10 with the loop being completed with insert 46 and plate 48.

The lamina are shaped the same since production costs in stamping these lamina are reduced and since the lamina may thus be easily assembled to form the tape head. N number of magnetic lamina 12, 14, 16, 18, 20, 22, 24 and 26 have respective gaps 52, 54, 56, 58, 60, 62, 64, 66 formed therein for picking up or recording a signal on the tape 11. The tape head gap 52, for instance, is formed by fingers 68 and 70 of lamina 12.

Pieces of magnetic material 90, 92, 94 and 96 (FIG. 1), *n*/2 in number, which may be made of iron oxide like the tape head lamina, act as magnetic cores. The flux changes in those cores in response to the electrical signals induced in the pickup portions' conduction loops formed by the copper lamina, insert 46, and conduction plate 48, by the magnetic tape 11 passing across the gaps in the selected magnetic tape head lamina. The changing flux in the cores subsequently induces a current in the coils 98, 100, 102 and 104, which are connected to terminals 106, 108, 110 and 112, respectively, of the recorder/reproducer 99 when operating in the reproducer mode.

When operating in the record mode, signals are applied to terminals 106, 108, 110 and 112 with the respective coils 98, 100, 102 and 104 inducing a changing magnetic flux in core pieces 90, 92, 94 and 96, respectively. This changing magnetic flux transverses the magnetic lamina such as through lamina 14 from arm 89 to arm 91 of iron core piece 90. A current is induced in a conduction loop comprising lamina 30 and 32, insert 46 and plate 48. This current in turn induces a changing magnetic flux encircling insert 46 in lamina 14 to bridge gap 54 to record the original signal on the tape 11. It should be noted that for either recording or reproduction modes, the alignment of the iron pieces 90, 92, 94 and 96 with respect to the iron lamina is not critical. Consequently, the physical shifting of these pieces does not require the accuracy that tape head shifting would require.

A typical shifting apparatus for the pieces of magnetic material is shown in FIG. 2 wherein a nonflux conducting metal bracket 114 mounted to the chassis 122 of the player 99 holds the iron pieces 90, 92, 94 and 96 in a spaced relation. Spring means 116 forces the bracket and cam follower 118 against the cam 120 with the bracket shifting from one position to another with rotation of the cam 120 in response, for instance, at the completion of playing a set of tracks, as is well known in the art. The core pieces of iron, which magnetically couple the iron lamina to the coils, are thus shifted from one set of iron lamina to another.

Another embodiment of the invention requires no physical shifting of coupling means from one iron lamina to another. Like parts are given like numbers. Separate core pieces of iron 142, 144, 146, 148, 150, 152, 154 and 156, respectively, are supplied for each iron lamina with each having a coil 158, 160, 162, 164, 168 and 172 respectively, (two of the coils for lamina 150 and 154 cannot be seen in the drawing) mounted thereon. The coils are wrapped on alterante legs for spacing. Shifting is accomplished in this particular apparatus by switching from one set of coils to another set by means of switch 124 connected to terminals 126, 128, 130, 132, which are in turn connected to the recorder/reproducer 134. The switch 124 may be either manual or automatic. In one case the switch is electronically actuated by the tape to perform switching from one set of tape head channels to another.

The copper lamina may have gaps 72, 74, 76, 78, 80, 82, 84, 86 and 88 as well as the iron lamina with the respective gaps aligned to make possible the use of a single apparatus for producing both iron and copper lamina. Production costs may thus be reduced. However, where high quality reproduction or recording performance is required, this reduction in cost may be outweighed by performance loss due to incompleteness of magnetic isolation of one magnetic lamina from another.

In this embodiment of the invention the iron lamina and coupling pieces of magnetic material may be formed of a single section 136 as shown in FIG. 4 with the coil mounted thereon. Production costs may thus be reduced and the magnetic coupling between the iron lamina 138 and iron core piece 140 improved.

What we have, therefore, is an accurate and more economical multiple channel tape head assembly suited for tapes having multiple tape channels.

I claim:

1. In a tape recorder or reproducer for use with a magnetic tape having a plurality of channels thereon, a multi-channel tape head comprising first and second lamina of flux conducting material each having fingers forming a gap to provide a separate tape head channel, three lamina of current conducting material alternately sandwiched with said flux conducting lamina, with said current conducting lamina magnetically isolating said flux conducting lamina one from another thereby isolating the channels of said multi-channel tape head, an insert of current conducting material connecting said flux conducting and current conducting lamina and providing a current conduction path, a current conducting member connected to said flux conducting lamina for completing a separate current conduction loop through said current conducting insert and around a portion of each of said flux conducting lamina, a coil, a core piece of flux conducting material providing a magnetic flux path, said core piece having said coil mounted thereon, a cam, a cam follower, a bracket connecting said cam follower and said core piece, said cam selectably acting to shift said core piece from one of said first and second flux conducting lamina to the other of said first and second flux conducting lamina upon activation of said cam, and said flux in said core piece changing in response to changing current in said current conducting loop around the selected one of said first and second flux conducting lamina to induce a current in said coil.

2. The tape head according to claim 1 wherein said lamina of flux conducting metal comprises iron.

3. The tape head according to claim 1 wherein said current conducting lamina comprises copper.

4. In a tape recorder or reproducer for use with a magnetic tape having a plurality of channels thereon, a multi-channel tape head comprising first and second lamina of iron each having a gap therein, three copper lamina positioned in alternating layers with said iron lamina, said copper lamina isolating magnetically said iron lamina one from another and thereby isolating said channels of said multi-channel tape head one from another, a copper insert connecting said iron and copper lamina and providing a current conduction path, a copper conductor connected to said copper lamina for completing a separate current conduction loop with said copper insert around a portion of each of said iron lamina, first and second core pieces of iron, said first core piece being substantially aligned with said first iron lamina and said second core piece being substantially aligned with said second iron lamina, a first coil mounted on said first core piece, a second coil mounted on said second core piece, said first core piece providing magnetic coupling between said first iron lamina and said first coil and said second core piece providing magnetic coupling between said second iron lamina and said second coil, and switch means connecting one of said first and second coils to the recorder or reproducer in one condition and the other of said first and second coils in a second condition.

* * * * *